US010875246B2

(12) United States Patent
Lee (10) Patent No.: US 10,875,246 B2
(45) Date of Patent: Dec. 29, 2020

(54) SYSTEM AND METHOD FOR ADDITIVE MANUFACTURING USING SPHERICAL COORDINATES (71) Applicant: Jay Lee, Leonardtown, MD (US)

(72) Inventor: Jay Lee, Leonardtown, MD (US)

(*) Notice: Subject to any disclaimer, the term of this patent is extended or adjusted under 35 U.S.C. 154(b) by 431 days.

(21) Appl. No.: 15/569,260

(22) PCT Filed: Apr. 29, 2016

(86) PCT No.: PCT/US2016/030051
§ 371 (c)(1),
(2) Date: Oct. 25, 2017

(87) PCT Pub. No.: WO2016/178977
PCT Pub. Date: Nov. 10, 2016

(65) Prior Publication Data
US 2018/0117848 A1 May 3, 2018

Related U.S. Application Data (60) Provisional application No. 62/155,832, filed on May 1, 2015.

(51) Int. Cl.
*B29C 64/241* (2017.01)
*B29C 64/118* (2017.01)
(Continued)

(52) U.S. Cl.
CPC .......... *B29C 64/241* (2017.08); *B29C 64/118* (2017.08); *B29C 64/232* (2017.08);
(Continued)

(58) Field of Classification Search
CPC ... B29C 64/232; B29C 64/236; B29C 64/241; B29C 64/245
See application file for complete search history.

(56) References Cited

U.S. PATENT DOCUMENTS

| 4,665,492 A | 5/1987 | Masters |
| 5,121,329 A | 6/1992 | Crump |

(Continued)

FOREIGN PATENT DOCUMENTS

| JP | 03018484 A | * | 1/1991 | |
| WO | 2002086752 A1 | | 10/2002 | |
| WO | WO-2016030782 A1 | * | 3/2016 | ........... B29C 64/245 |

OTHER PUBLICATIONS

PCT ISR and WO Ser. No. PCT/US2016/030051 dated Sep. 6, 2016 (dated Sep. 9, 2016).

*Primary Examiner* — Atul P. Khare
(74) *Attorney, Agent, or Firm* — Carlos R. Villamar; The Villamar Firm PLLC (57) ABSTRACT A system, method and computer program product for an additive manufacturing or three dimensional (3D) printing system, including a build point, located at a n origin of a Spherical coordinate system; a theta axis motor configured to incrementally control rotation of the build point in relation to an extruder head along the theta axis; a phi axis motor configured to incrementally control rotation of the build point in relation to the extruder head along the phi axis perpendicular to the theta axis; and a rho radius motor configured to incrementally control the extruder head to a desired radius from the build point.

11 Claims, 6 Drawing Sheets (51) Int. Cl.
*B33Y 50/00* (2015.01)
*B29C 64/236* (2017.01)
*B29C 64/232* (2017.01)
*B33Y 10/00* (2015.01)
*B33Y 30/00* (2015.01)
*B33Y 50/02* (2015.01)
*B29C 64/393* (2017.01)

(52) U.S. Cl.
CPC .......... *B29C 64/236* (2017.08); *B29C 64/393* (2017.08); *B33Y 10/00* (2014.12); *B33Y 30/00* (2014.12); *B33Y 50/00* (2014.12); *B33Y 50/02* (2014.12)

(56) References Cited

U.S. PATENT DOCUMENTS

| | | | | |
|---|---|---|---|---|
| 5,216,616 | A * | 6/1993 | Masters | B29C 35/08 264/401 |
| 5,257,657 | A * | 11/1993 | Gore | B22D 23/00 164/46 |
| 5,717,599 | A * | 2/1998 | Menhennett | B33Y 10/00 700/118 |
| 7,168,935 | B1 * | 1/2007 | Taminger | B29C 64/141 425/174.4 |
| 9,481,131 | B2 * | 11/2016 | Yerazunis | B29C 64/386 |
| 2014/0197576 | A1 | 7/2014 | Kraibuhler et al. | |
| 2014/0271964 | A1 | 9/2014 | Roberts, IV et al. | |
| 2017/0165915 | A1 * | 6/2017 | Deng | B29C 64/236 |
| 2019/0240903 | A1 * | 8/2019 | Isobe | B33Y 50/02 |

* cited by examiner

SYSTEM AND METHOD FOR ADDITIVE MANUFACTURING USING SPHERICAL COORDINATES

CROSS REFERENCE TO RELATED DOCUMENTS

The present invention claims benefit of priority to U.S. Provisional Patent Application Ser. No. 62/155,832 of Jay Lee, entitled "SYSTEM AND METHOD FOR ADDITIVE MANUFACTURING USING SPHERICAL COORDINATES," filed on May 1, 2015, the entire disclosure of which is hereby incorporated by reference herein.

BACKGROUND OF THE INVENTION

Field of the Invention

The present invention generally relates to Additive Manufacturing, commonly known as three dimensional (3D) printing, and more particularly to a method and system for 3D printers with a physical structure designed and optimized for Spherical coordinates rather than Cartesian coordinates, and with software, and the like, to control the 3D printer device.

Discussion of the Background

Current three dimensional (3D) printers use X, Y, Z coordinates, also known as Cartesian coordinates. One disadvantage of using Cartesian 3D printers is that the finished product is limited by the build plate. Other disadvantages of using Cartesian 3D printers are that it is difficult to print horizontal overhangs, and impossible to print down sloping structures. A work around is to print objects in different orientations to avoid this limitation, such as printing an open umbrella upside down so there is no overhang. Another work around is to manufacture the object with supports that must be removed to obtain the finished product. Another work around is to print parts separately and assemble them to obtain the finished product, but this results in seams. Accordingly, there are and will always be certain objects that cannot be fabricated using Cartesian 3D printers.

SUMMARY OF THE INVENTION

Therefore, there is a need for a method and system that addresses the above and other problems with conventional Cartesian three dimensional (3D) printers. The above and other problems are addressed by the illustrative embodiments of the present invention, which provide for an improved additive manufacturing device or 3D printer based on Spherical coordinates, and software, and the like, to control the 3D printer device. The terms used in spherical coordinates are rho, theta, and phi, wherein Rho is the distance from the origin to the point, Theta is the angle from the x-axis in the horizontal plane, and is the same as the angle used in polar coordinates, and Phi is the angle between the z-axis and the line connecting the origin and the point. The convention for these terms varies in different fields, such as mathematics as compared to physics. Any equivalent convention can be used in place of the sample convention illustrated herein. In all conventions, the origin is the point where rho equals zero. A Spherical coordinate 3D printer offers distinct advantages, including being able to print horizontal overhangs and down sloping structures, and wherein an object to be printed is not limited by a build plate, and the like. As the proposed 3D printer uses Spherical coordinates, not polar or cylindrical coordinates, there is no need for a rotating build plate or build cylinder. Advantageously, the Spherical coordinate 3D printer is easy to manufacture and operate, is aesthetically pleasing, is more physically compact and portable, has fewer parts, and generally overcomes many of the numerous problems noted with respect to prior art 3D printer devices.

Accordingly, in illustrative aspects of the present invention there is provided a system, method, and computer program product for an additive manufacturing or three dimensional (3D) printing system, including a build point, located at an origin of a Spherical coordinate system; a theta axis motor configured to incrementally control rotation of the build point in relation to an extruder head along the theta axis; a phi axis motor configured to incrementally control rotation of the build point in relation to the extruder head along the phi axis perpendicular to the theta axis; and a rho radius motor configured to incrementally control the extruder head to a desired radius from the build point.

At least one of the theta axis motor, phi axis motor, and rho radius motor comprise a stepper motor.

The build point is made of a durable material, if a finished 3D printed product is removed from the build point, and the build point is reused.

The build point is made of a substrate material, if the build point is a part of a finished 3D printed product.

The system, method, and computer program product further include a support bar configured to support the build point and made of a substrate material, if the support bar is part of a finished 3D printed product.

The build point and the support bar do not occupy the origin, if no substrate material is at the origin in the finished 3D printed product.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which.

DETAILED DESCRIPTION OF THE PREFERRED EMBODIMENTS

Generally, the present invention is directed to a system, method and computer program product for additive manufacturing or three dimensional (3D) printing including hardware and software based on and optimized for Spherical coordinates rather than Cartesian coordinates. This 3D printing device utilizes a build point held at the origin in a Spherical coordinate system, rather than a build plate held at z=0 in a Cartesian coordinate system. Advantageously, the build point does not limit the finished product by the plane defined by a build plate. Such 3D printing device uses a mechanical system that allows all suitable points on the surface of a sphere defined by a set rho (e.g., radius) from the build point to pass under the extruder head and nozzle. Advantageously, such a mechanical system can control rotation of the build point in precise increments along two perpendicular axes, theta and phi. As rho is increased in precise increments from zero, the finished product is fabricated. Advantageously, certain products not possible to manufacture using a Cartesian coordinate 3D printer can be made using the described Spherical coordinate 3D printer.

Figure 1:
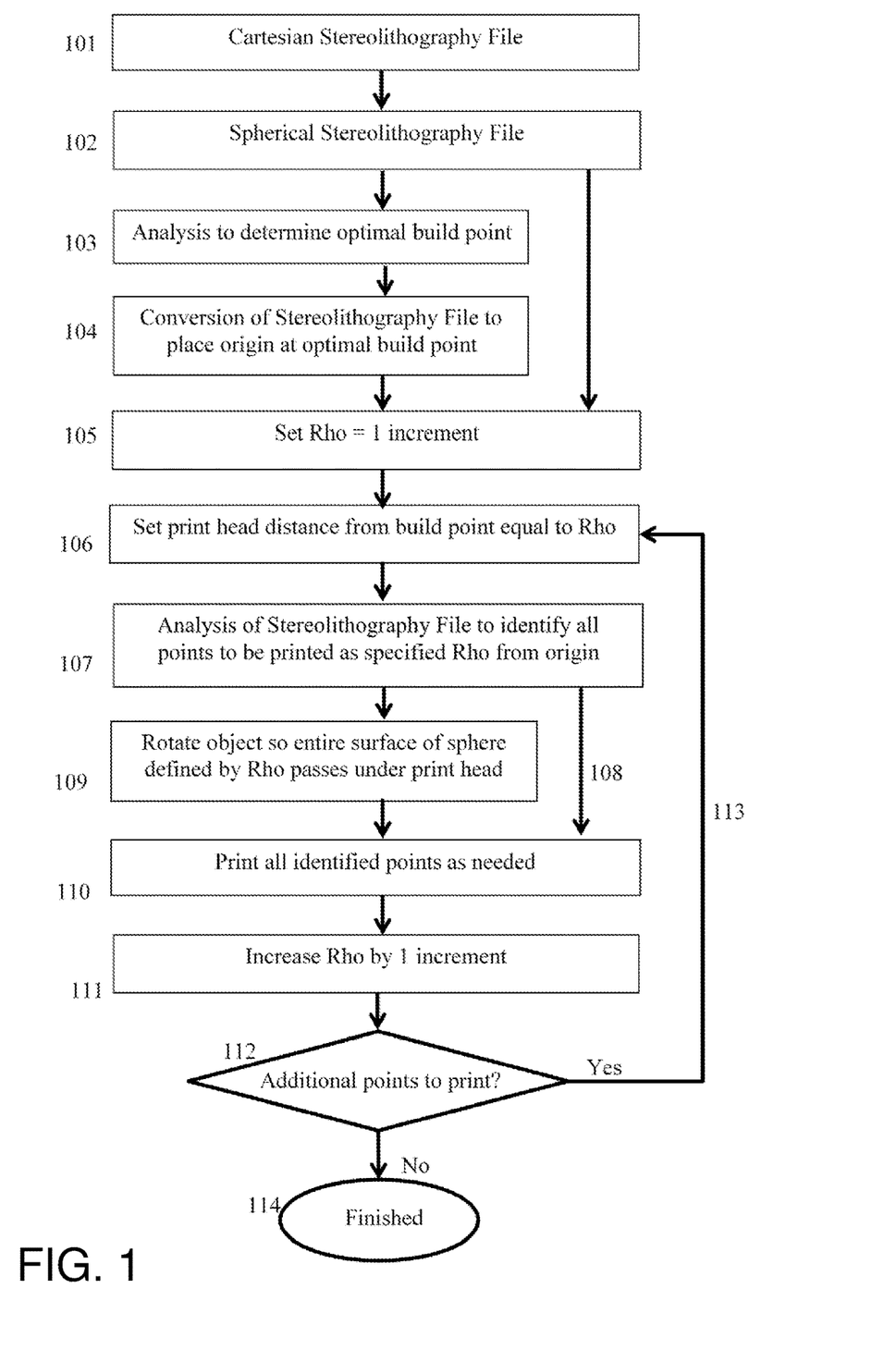
FIG. 1 is an illustrative example of a software flow chart to control a Spherical coordinate three dimensional (3D) printer.

Referring now to the drawings, wherein like reference numerals designate identical or corresponding parts throughout the several views, and to FIG. 1 thereof, there is illustrated a Spherical coordinate 3D printer software to control a Spherical coordinate 3D printer, according to the present invention. In FIG. 1, the illustrative software can be used to control the Spherical coordinate 3D printer shown in FIGS. 2-3. The product or object to be designed or 3D printed is imported at step 101, for example, as a stereolithography file or equivalent thereof, and the like. The current standard is to use a file based on Cartesian coordinates at step 101, which can be converted to a file based on Spherical coordinates at step 102.

Alternatively, the product design can be imported as a file based on Spherical coordinates at step 102 from the very start to eliminate the need for Cartesian to Spherical conversion. There are certain advantages to analyzing the file to determine the optimal build point at step 103 and convert the stereolithography file from step 102 to place the origin at the optimal build point at step 104, for example, in print speed and in mitigating areas that may be difficult to print, and the like.

The Spherical coordinate 3D printer uses Rho to determine the distance from the print head to the build point. To start printing, Rho is set to one increment at steps 105, and 106. The stereolithography file is analyzed to identify all points to be printed at a Rho of one increment at step 107. The build point is rotated through all angles of Theta and Phi so the entire surface of the sphere defined by Rho passes under the print head at step 109. All identified points are printed at step 110. Alternatively, the build point can be rotated in such a manner as to minimize passing over points that do not need to be printed at step 108.

Rho is increased by one increment at step 111. The stereolithography file is analyzed to identify all points to be printed at this new Rho at step 112. If there are no more points to be printed, the 3D print job is finished at step 114. If there are additional points to be printed, at step 112, the print head is set to the new Rho at step 106 and the process is repeated as needed at steps 107, 109, 110, 111, and 112.

As Rho increases, the rotation along Theta and Phi can be configured to be in smaller increments, for example, to maintain a standard "pixel" size, so that the volume of substrate employed at specified locations can remain relatively constant. In addition, the stereolithography file can be analyzed through suitable software to control the hardware to minimize the time needed to print, for example, using suitable algorithms that differ from what is illustrated in FIG. 1. For example, if the desired product includes relatively thin branches separated by relatively large gaps, theta and phi can be held relatively constant, while rho is increased to finish printing that branch, then theta and phi can be changed, and the process repeated to print subsequent branches. For algorithms that differ from what is illustrated in FIG. 1, analysis of the algorithms can be conducted by appropriately configured software so as to ensure that no part of the extruder head contacts the product unintentionally.

Figure 2:
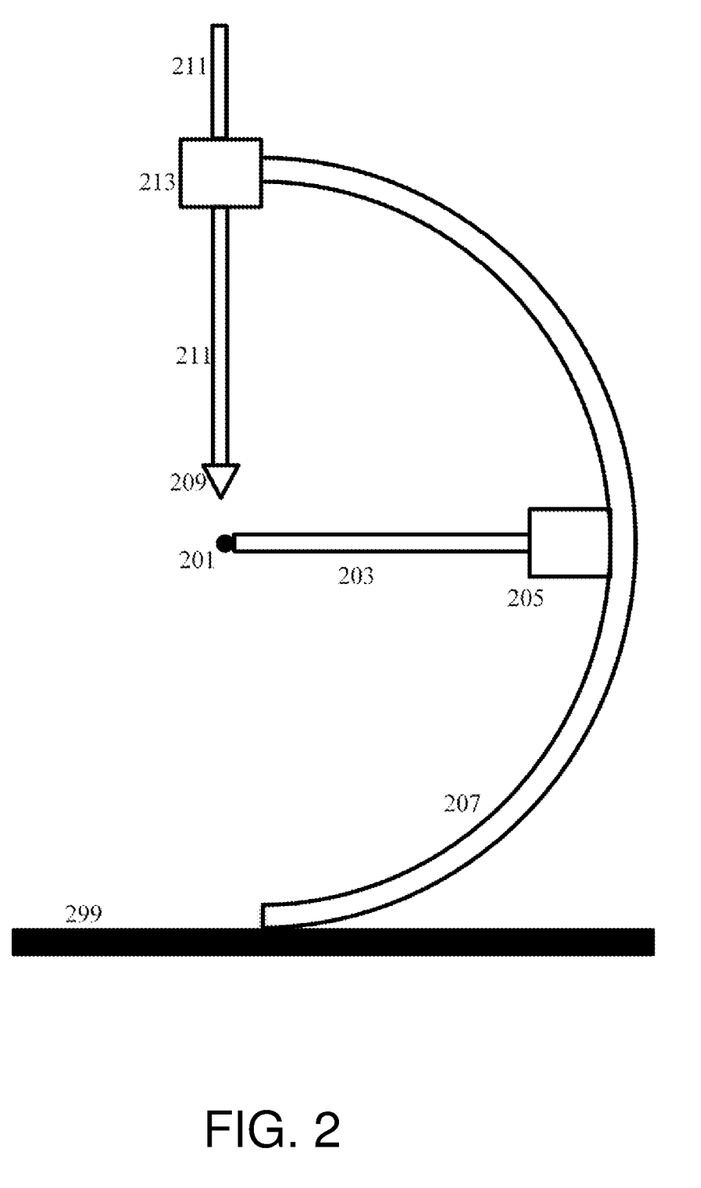
FIG. 2 is an illustrative example of a design for a Spherical coordinate 3D printer.

FIG. 2 is an illustrative design for a Spherical coordinate 3D printer, with software operation described, for example, as shown in FIG. 1. In FIG. 2, the Spherical coordinate 3D printer has a build point 201, which can be a bead of commonly used 3D printer substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalateglycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials), and the like, if it is intended to become an integral part of the finished 3D printed product. Alternatively, a reusable bead made of any suitable durable material (e.g., metal, plastic, glass, porcelain) can be mounted at the build point 201 and from which the finished 3D printed product can be removed.

A build rod 203 holds the build point 201 at the origin. The build rod 203 can be made of any suitable 3D printer substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalateglycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials) in any suitable shape if it is intended to become an integral part of the finished 3D printed product, as long as the build point is held at the origin. Alternatively, a reusable build rod 203 made of any suitable durable material (e.g., metal, plastic, glass, porcelain) can be used, if it is not intended to become part of the finished 3D printed product. The build point and support bar combination does not need to occupy the origin if there is to be no substrate material at the origin in the finished product.

The build rod 203 can be rotated on its long axis through 360 degrees in precise increments, for example, using any suitable device, such as a stepper motor 205, and the like, so the build point 201 is rotated around the axis defined by the build rod 203.

The device at 205 can be configured to be moved along the semicircular track 207 in precise increments using any suitable device, such as a stepper motor, and the like, in such a way that the build point 201 remains at the origin, but is rotated in a plane perpendicular to the axis defined by the build rod 203. An extruder head and nozzle 209 is supported by an extruder support 211, which can be raised in precise increments by any suitable device, such as a stepper motor 213, and the like. A suitable frame stand 299 is provided made of any suitable material and of sufficient size to provide for support, stability, and the like. The semicircular track 207, extruder support 211, frame stand 299, and similar support elements can be made of any suitable material (e.g., metal for strength, stainless steel and aluminum for corrosion resistance, glass or plastic for aesthetics, or aluminum, titanium, plastic to minimize weight), and the like.

Figure 3:
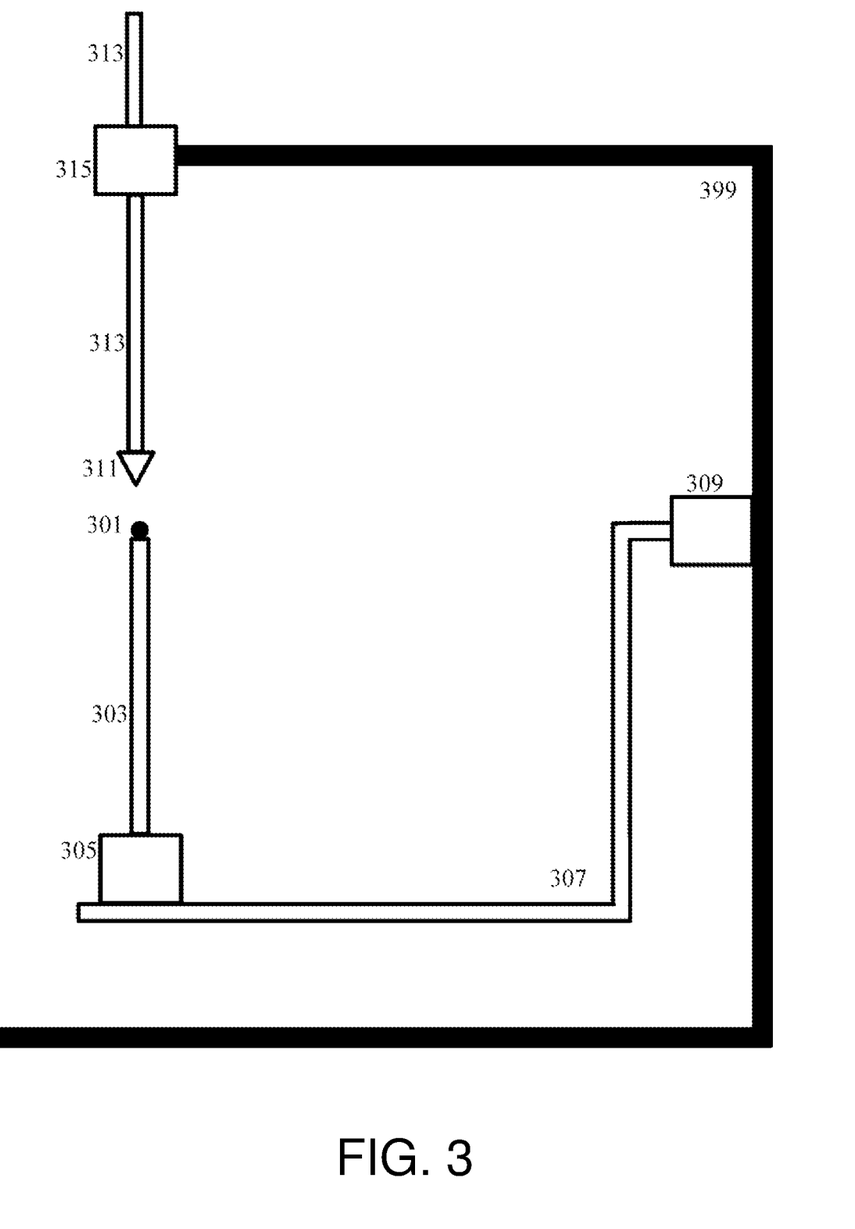
FIG. 3 is an illustrative example of another design for a Spherical coordinate 3D printer.

FIG. 3 is another illustrative design for a Spherical coordinate 3D printer, with software operation described, for example, as shown in FIG. 1. In FIG. 3, the Spherical coordinate 3D printer has a build point 301, for example, as described with respect to the build point 201 of FIG. 2. Such build point can be a bead of commonly used 3D printer substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalateglycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials), and the like, if it is intended to become an integral part of the finished 3D printed product. Alternatively, a reusable bead made of any suitable durable material (e.g., metal, plastic, glass, porcelain) can be mounted at the build point 301 and from which the finished 3D printed product can be removed.

A build rod 303 holds the build point 301 at the origin. Similar to the build rod 203 of FIG. 2, the-build rod 303 can be made of substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalateglycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials) in any shape if it is intended to become an integral part of the finished 3D printed product, as long as the build point 301 is held at the origin. Alternatively, a reusable build rod 303 made of any suitable durable material (e.g., metal, plastic, glass, porcelain) can be used, if it is not intended to become part of the finished 3D printed product. The build point and build rod combination does not need to occupy the origin if there is to be no substrate material at the origin in the finished product.

The build rod 303 can be rotated on its long axis through 360 degrees in precise increments, for example, using any suitable device, such as a stepper motor 305, and the like, so the build point 301 is rotated around the axis defined by the build rod 303. The device at 305 is mounted on a support bar 307, which can be rotated in precise increments in such a way that the build point always remains at the origin but is rotated in an axis perpendicular to the build rod 303, for example, using any suitable device, such as a stepper motor 309, and the like.

An extruder head and nozzle 311 is supported by an extruder support 313, which can be raised in precise increments, for example, using any suitable device, such as a stepper motor 315, and the like. A suitable frame stand 399 is provided made of any suitable material and of sufficient size to provide for support, stability, and the like. The support bar 307, extruder support 313, frame stand 399, and similar support elements can be made of any suitable material (e.g., metal for strength, stainless steel and aluminum for corrosion resistance, glass or plastic for aesthetics, or aluminum, titanium, or plastic to minimize weight), and the like.

Figure 4:
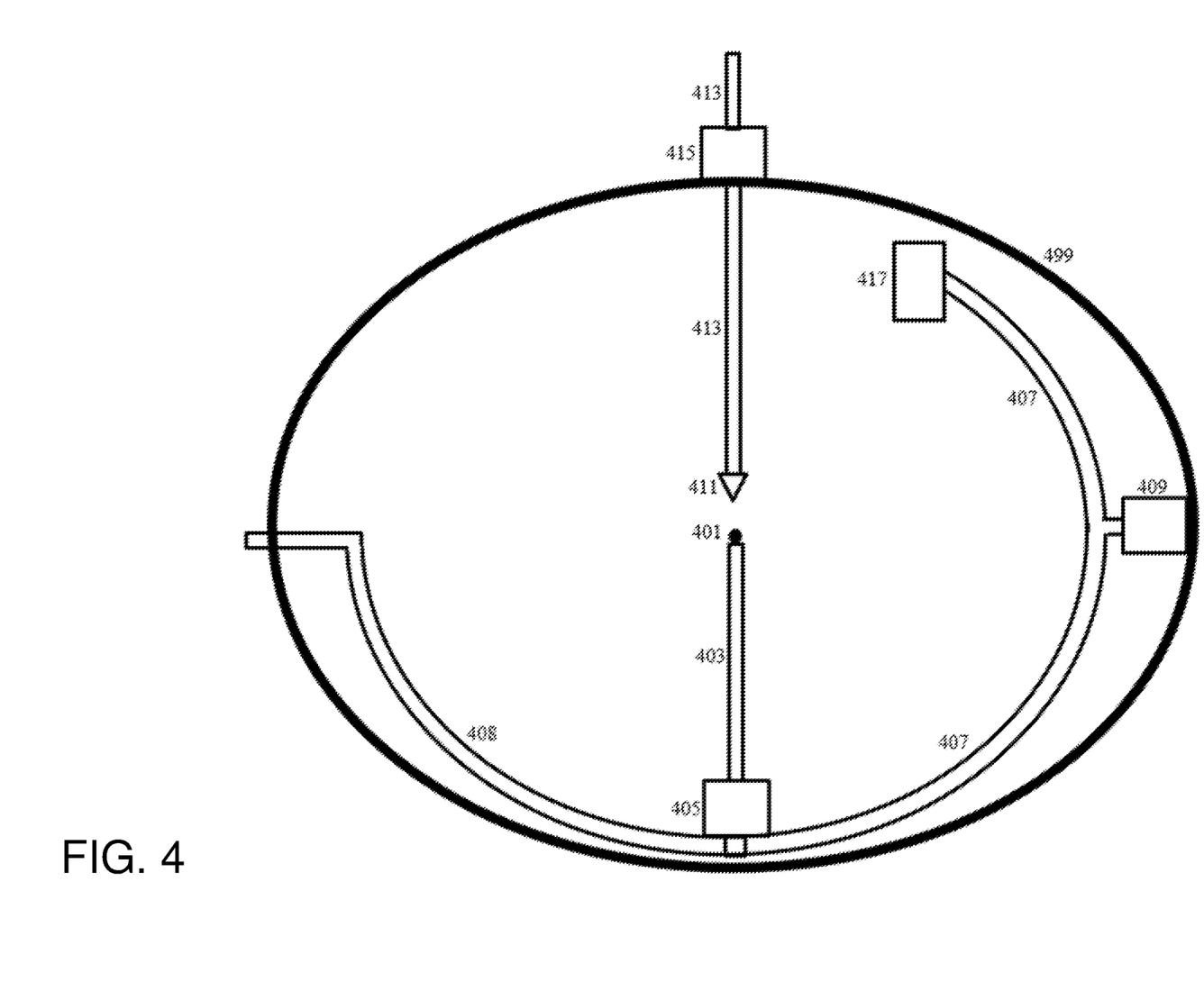
FIG. 4 is an illustrative example of another design for a Spherical coordinate 3D printer.

FIG. 4 is another illustrative design for a Spherical coordinate 3D printer, with software operation described, for example, as shown in FIG. 1. In FIG. 4, the Spherical coordinate 3D printer has a build point 401, for example, as described with respect to the build point 401 of FIG. 2. Such build point can be a bead of commonly used 3D printer substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalate glycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials), and the like, if it is intended to become an integral part of the finished 3D printed product. Alternatively, a reusable bead made of any suitable durable material (e.g., metal, plastic, glass, porcelain) can be mounted at the build point 401 and from which the finished 3D printed product can be removed.

A build rod 403 holds the build point 401 at the origin. Similar to the build rod 203 of FIG. 2, the build rod 403 can be made of substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalate glycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials) in any shape if it is intended to become an integral part of the finished 3D printed product, as long as the build point 401 is held at the origin. Alternatively, a reusable build rod 403 made of any suitable durable material (e.g., metal, plastic, glass, porcelain) can be used, if it is not intended to become part of the finished 3D printed product. The build point and support bar combination does not need to occupy the origin if there is to be no substrate material at the origin in the finished product.

The build rod 403 can be rotated on its long axis through 360 degrees in precise increments, for example, using any suitable device, such as a stepper motor 405, and the like, so the build point 401 is rotated around the axis defined by the build rod 403. The device at 405 is mounted on a support bar 407, which can be rotated in precise increments in such a way that the build point always remains at the origin but is rotated in an axis perpendicular to the build rod 403, for example, using any suitable device, such as a stepper motor 409, and the like. The device at 405 is mounted to a second support bar 408 for support and stability.

A counterweight 417 balances the weight of the build rod 403, the device at 405, the support bar 407, and the support bar 408. The counterweight 417 can be moved along the support bar 407 as needed for balancing objects being printed with a center of gravity a significant distance from the origin using any suitable device, such as a stepper motor, and the like. The counterweight 417 may include or be completely comprised of this suitable device, such as a stepper motor, and the like.

An extruder head and nozzle 411 is supported by an extruder support 413, which can be raised in precise increments, for example, using any suitable device, such as a stepper motor 415, and the like. A suitable frame stand 499 is provided made of any suitable material and of sufficient size to provide for support, stability, and the like. The support bar 407, extruder support 413, frame stand 499, and similar support elements can be made of any suitable material (e.g., metal for strength, stainless steel and aluminum for corrosion resistance, glass or plastic for aesthetics, or aluminum, titanium, or plastic to minimize weight), and the like.

Figure 5:
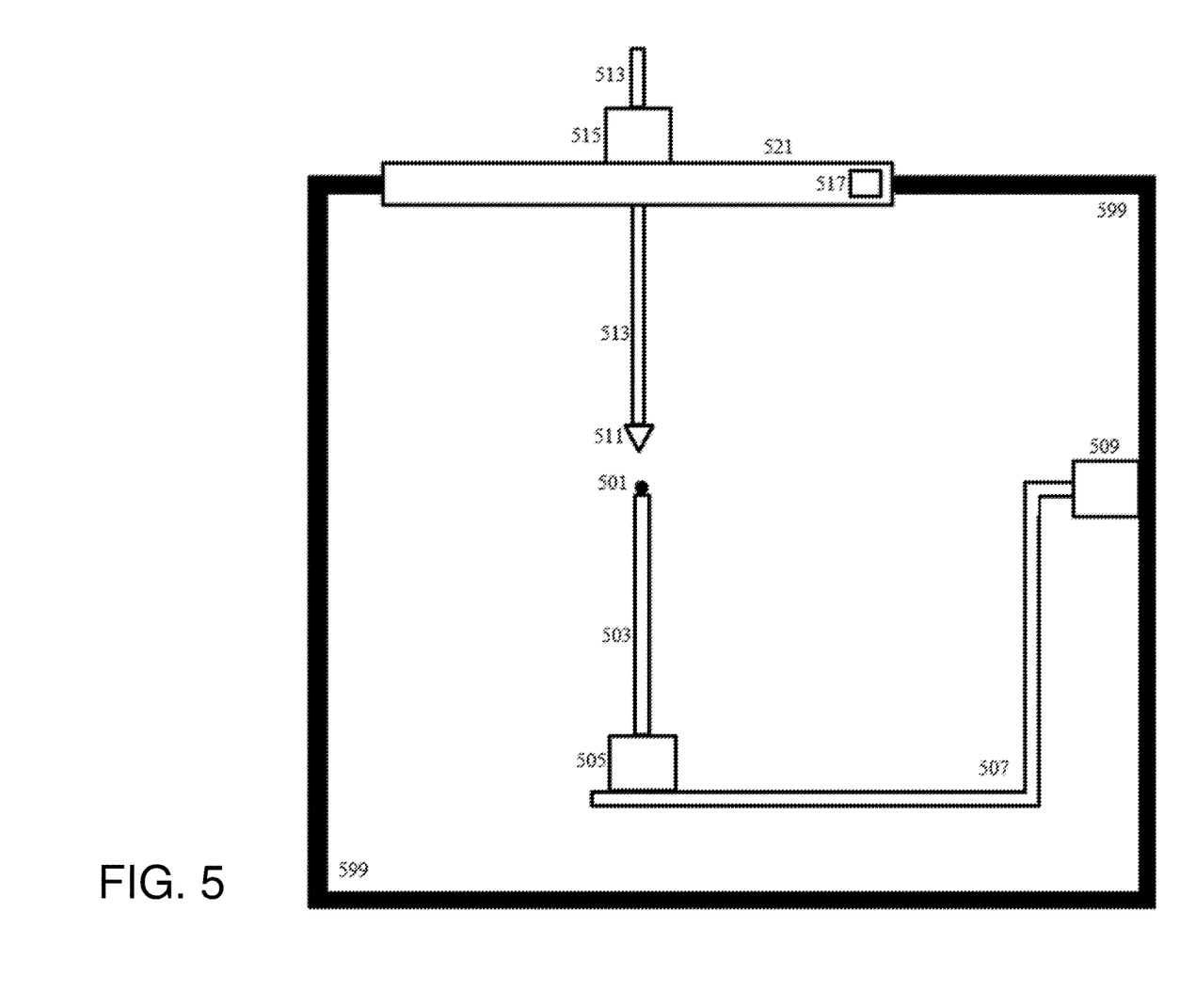
FIGS. 5-6 are an illustrative example of another design for a Spherical coordinate 3D printer.
Figure 6:
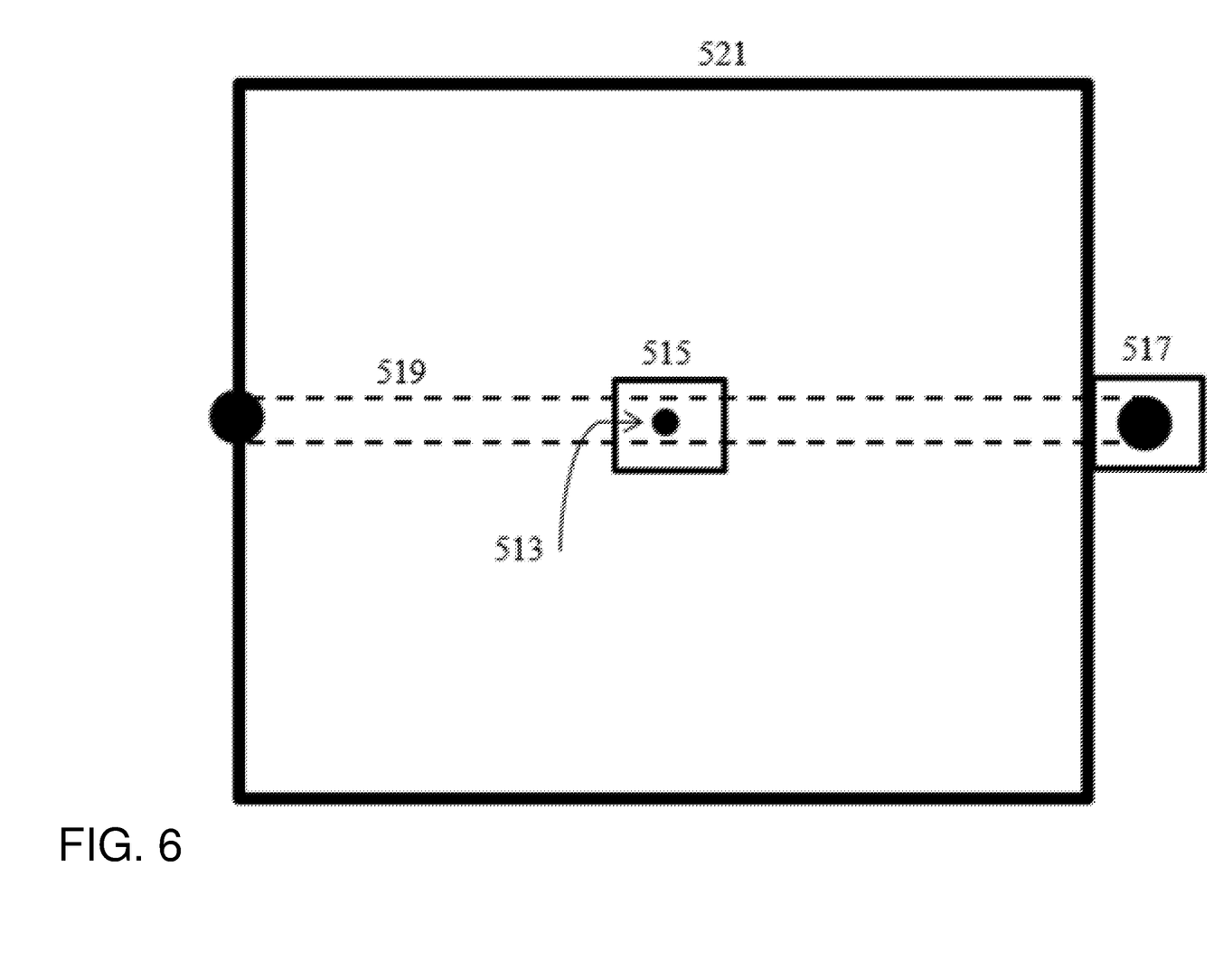

FIGS. 5-6 are another illustrative design for a Spherical coordinate 3D printer, with software operation described, for example, as shown in FIG. 1. In FIG. 5-6, the Spherical coordinate 3D printer has a build point 501, for example, as described with respect to the build point 201 of FIG. 2. Such build point can be a bead of commonly used 3D printer substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalate glycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials), and the like, if it is intended to become an integral part of the finished 3D printed product. Alternatively, a reusable bead made of any suitable durable material (e.g., metal, plastic, glass, porcelain) can be mounted at the build point 501 and from which the finished 3D printed product can be removed.

A build rod 503 holds the build point 501 at the origin. Similar to the build rod 203 of FIG. 2, the build rod 503 can be made of substrate material (e.g., polylactic acid (PLA), acrylonitrile butadiene styrene (ABS), polyvinyl alcohol (PVA), high impact polystyrene (HIPS), nylon, polyethylene terephthalate (PET), polyethylene terephthalate glycol-modified (PET-G, T-Glase), mixture of milled chalk and co-polyesters (LayBrick), wood particles mixed together with some binding polymers (LayWood), polypropylene, high density polyethylene (HDPE), steel, stainless steel, titanium, cobalt, aluminum, other metals and alloys, modeling clay, RTV silicone, porcelain, metal clay, rubber, biocompatible materials, cells and supporting components, chocolate, candy, pasta, crackers, pizza, other edible materials) in any shape if it is intended to become an integral part of the finished 3D printed product, as long as the build point 501 is held at the origin. Alternatively, a reusable build rod 503 made of any suitable durable material (e.g., metal, plastic, glass, porcelain) can be used, if it is not intended to become part of the finished 3D printed product. The build point and support bar combination does not need to occupy the origin if there is to be no substrate material at the origin in the finished product.

The build rod 503 can be rotated on its long axis through 360 degrees in precise increments, for example, using any suitable device, such as a stepper motor 505, and the like, so the build point 501 is rotated around the axis defined by the build rod 503. The device at 505 is mounted on a support bar 507, which can be rotated in precise increments in such a way that the build point always remains at the origin but is rotated in an axis perpendicular to the build rod 503, for example, using any suitable device, such as a stepper motor 509, and the like.

An extruder head and nozzle 511 is supported by an extruder support 513, which can be raised in precise increments, for example, using any suitable device, such as a stepper motor 515, and the like. A suitable frame stand 599 is provided made of any suitable material and of sufficient size to provide for support, stability, and the like. The support bar 507, extruder support 513, frame stand 599, and similar support elements can be made of any suitable material (e.g., metal for strength, stainless steel and aluminum for corrosion resistance, glass or plastic for aesthetics, or aluminum, titanium, or plastic to minimize weight), and the like.

The extruder head and nozzle 511 can be moved along at least one axis in the horizontal plane controlled by a mechanism 521. The mechanism 521 controls movement in each horizontal axis using at least one suitable device, such as a stepper motor 517, and the like, in combination with any suitable device, such as a belt or threaded rod 519, and the like. In effect this mechanism 521 combines functionalities of a traditional Cartesian 3D printer or Polar (also known as Cylindrical) 3D printer with the Spherical 3D printer described herein.

The above-described devices and subsystems of the illustrative embodiments can include, for example, any suitable servers, workstations, PCs, laptop computers, microcomputers, microcontrollers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, flash memory, SSD, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, integrated development environment, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A spherical coordinate three dimensional (3D) printing system, the system comprising:
   a support frame;
   a motor support bar;
   a build rod;
   an extruder support bar;
   an extruder head disposed on the extruder support bar;
   a theta axis motor disposed on the motor support bar and configured to incrementally control rotation, via the build rod, of a build point located at an origin of a spherical coordinate system defined in the system in relation to the extruder head along 360 degrees of a long axis of the build rod;
   a phi axis motor disposed on the frame and connected to the motor support bar and configured to incrementally control rotation of the theta axis motor, the motor support bar, and the build point in relation to the extruder head along 360 degrees of an axis perpendicular to the long axis in such a way that the build point remains at the origin, the build rod and extruder support bar capable of being provided along a common axis by the phi axis motor rotation; and
   a rho radius motor disposed on the frame and configured to incrementally control the extruder support bar and the extruder head to a desired radius from the build point.

2. The system of claim 1, wherein at least one of the theta axis motor, phi axis motor, and rho radius motor comprise a stepper motor.

3. The system of claim 1, wherein the build point is made of a substrate material of a 3D printed product being formed by the system.

4. The system of claim 1, wherein the build rod is configured to support the build point and is made of a substrate material of a 3D printed product being formed by the system.

5. The system of claim 1, wherein the build point and build rod are capable of being arranged so as not to occupy the origin for a 3D printed product being formed by the system with no substrate material at the origin.

6. The system of claim 1, wherein the build point is made of a durable material, a 3D printed product being formed by the system being configured to be removed from the build point so that the build point can be reused by the system for manufacturing another 3D printed product.

7. The system of claim 1, wherein the motor support bar has three planar sections each joined by an L-shaped section thereof.

8. The system of claim 1, wherein the motor support bar is curved.

9. The system of claim 1, wherein the motor support bar is a first motor support bar, and wherein the system further comprises a second motor support bar to which the theta axis motor is mounted for support and stability.

10. The system of claim 9, further comprising a counterweight configured to balance the weight of the build rod, the theta axis motor, the first motor support bar, and the second motor support bar, the counterweight being movable along the first motor support bar for balancing an object being printed by the system with a center of gravity disposed a significant distance from the origin.

11. The system of claim 1, further comprising a mechanism configured to move the extruder head, via the extruder support bar, along at least one axis running perpendicular to the incrementally controlled movement to a desired radius provided by the rho axis motor.

* * * * *